US012489746B2

United States Patent
Chin et al.

(10) Patent No.: US 12,489,746 B2
(45) Date of Patent: Dec. 2, 2025

(54) APP FREE AUTHENTICATION ACROSS CHANNELS

(71) Applicant: Ping Identity International, Inc., Denver, CO (US)

(72) Inventors: Justin Chin, Raleigh, NC (US); John Hamilton Kimble, II, Allen, TX (US)

(73) Assignee: Ping Identity International, Inc., Denver, CO (US)

( * ) Notice: Subject to any disclaimer, the term of this patent is extended or adjusted under 35 U.S.C. 154(b) by 472 days.

(21) Appl. No.: 17/956,740

(22) Filed: Sep. 29, 2022

(65) Prior Publication Data

US 2024/0121238 A1    Apr. 11, 2024

(51) Int. Cl.
*H04L 9/40* (2022.01)

(52) U.S. Cl.
CPC ...... *H04L 63/0853* (2013.01); *H04L 63/0861* (2013.01)

(58) Field of Classification Search
None
See application file for complete search history.

(56) References Cited

U.S. PATENT DOCUMENTS

| | | | |
|---|---|---|---|
| 6,633,898 B1 | 10/2003 | Seguchi et al. | |
| 8,887,262 B1 * | 11/2014 | Turner | H04W 12/06 726/10 |
| 9,167,428 B2 * | 10/2015 | Buntinx | H04L 63/168 |
| 9,363,259 B2 * | 6/2016 | Chenna | H04L 9/3271 |
| 9,369,457 B2 * | 6/2016 | Grajek | H04L 63/0853 |
| 9,720,750 B1 | 8/2017 | Abrams et al. | |
| 9,887,992 B1 * | 2/2018 | Venkat | G06F 21/35 |
| 10,158,489 B2 * | 12/2018 | Shastri | H04L 63/0853 |
| 10,265,694 B2 | 4/2019 | Aizenberg et al. | |
| 10,299,118 B1 * | 5/2019 | Karachiwala | H04L 67/55 |
| 10,303,576 B1 | 5/2019 | Seymour et al. | |
| 10,630,501 B2 | 4/2020 | Ansari et al. | |

(Continued)

OTHER PUBLICATIONS

U.S. Appl. No. 16/579,740, filed Sep. 23, 2019, U.S. Pat. No. 10,817,346, Oct. 27, 2020, Issued.

(Continued)

*Primary Examiner* — Backhean Tiv

(57) ABSTRACT

The technology disclosed teaches performing biometric app free authentication or authorization of a user to access a web-based application, with the user interacting with a workstation browser running on a workstation to access the web-based application using built-in resources of a smart/mobile device. A web application uses methods to authenticate and authorize users before the users are permitted to access the application. A demand exists for improving the security and ease of use of authentication and access management. Access management and authentication of users has evolved to more than just entering a username and password. Multi-factor authentication (MFA) is common. The numerous paths involved in authentication use numerous forms of identification of users during the authentication journey. An opportunity arises to combine paths used for non-standard circumstances with device codes and biometrics for users to log into web applications conveniently and securely without installing another app for authentication and authorization.

22 Claims, 7 Drawing Sheets

(56) References Cited

U.S. PATENT DOCUMENTS

| | | | |
|---|---|---|---|
| 10,686,885 B2 | 6/2020 | Goyal et al. | |
| 10,705,808 B2 | 7/2020 | Chiosi et al. | |
| 10,742,634 B1* | 8/2020 | Shahbazi | H04W 12/77 |
| 10,812,473 B2* | 10/2020 | Ramesh Kumar | H04L 63/0807 |
| 10,817,346 B1 | 10/2020 | Culp et al. | |
| 10,922,284 B1 | 2/2021 | Venkatasubramanian et al. | |
| 10,938,940 B2 | 3/2021 | Alla | |
| 11,030,299 B1* | 6/2021 | Ilincic | G06F 21/45 |
| 11,075,791 B2 | 7/2021 | Prathipati et al. | |
| 11,165,581 B2* | 11/2021 | Hunt | H04L 63/0861 |
| 11,321,983 B2* | 5/2022 | Seenivasagam | H04L 9/50 |
| 11,347,560 B2 | 5/2022 | Culp et al. | |
| 11,374,759 B2* | 6/2022 | Pellizzer | H04L 63/0815 |
| 11,394,712 B2* | 7/2022 | Monica | G06Q 20/367 |
| 11,405,189 B1* | 8/2022 | Bennison | H04L 63/0807 |
| 11,562,055 B2* | 1/2023 | Tussy | G06V 40/50 |
| 11,777,992 B1 | 10/2023 | Cross et al. | |
| 11,831,754 B2* | 11/2023 | Barbir | H04L 9/3213 |
| 11,895,225 B2* | 2/2024 | Bennison | H04L 9/3213 |
| 2013/0111208 A1* | 5/2013 | Sabin | G06F 21/36 713/176 |
| 2013/0167208 A1* | 6/2013 | Shi | H04L 63/18 726/5 |
| 2013/0262857 A1* | 10/2013 | Neuman | H04L 63/0823 713/155 |
| 2013/0262858 A1* | 10/2013 | Neuman | H04L 9/30 713/155 |
| 2013/0262873 A1* | 10/2013 | Read | H04L 63/0861 713/186 |
| 2014/0007205 A1* | 1/2014 | Oikonomou | G06F 21/36 726/6 |
| 2014/0316797 A1 | 10/2014 | Biernacki et al. | |
| 2015/0205708 A1 | 7/2015 | Michelsen | |
| 2015/0341344 A1* | 11/2015 | Dorfman | G06Q 20/3276 726/7 |
| 2016/0036809 A1* | 2/2016 | Bhimanaik | H04L 63/102 726/4 |
| 2017/0118025 A1* | 4/2017 | Shastri | H04L 9/00 |
| 2017/0257363 A1* | 9/2017 | Franke | H04W 12/069 |
| 2017/0295062 A1 | 10/2017 | Tang | |
| 2017/0359339 A1* | 12/2017 | Hevizi | H04M 1/72406 |
| 2018/0088982 A1 | 3/2018 | Abrams et al. | |
| 2018/0197128 A1 | 7/2018 | Carstens et al. | |
| 2019/0356693 A1 | 11/2019 | Cahana et al. | |
| 2019/0384662 A1 | 12/2019 | Bonnell | |
| 2019/0391897 A1 | 12/2019 | Vijendra et al. | |
| 2020/0034254 A1 | 1/2020 | Natanzon | |
| 2020/0073655 A1 | 3/2020 | Park et al. | |
| 2020/0136987 A1 | 4/2020 | Nakfour | |
| 2020/0162255 A1* | 5/2020 | Hunt | H04L 63/083 |
| 2020/0236113 A1* | 7/2020 | Monica | H04L 9/50 |
| 2020/0236116 A1* | 7/2020 | Bower | G06K 19/0723 |
| 2020/0280517 A1 | 9/2020 | Kwon et al. | |
| 2021/0004253 A1 | 1/2021 | Barnes et al. | |
| 2021/0049684 A1* | 2/2021 | Chen | G06Q 20/18 |
| 2021/0072966 A1 | 3/2021 | Zong et al. | |
| 2021/0082575 A1 | 3/2021 | Ji et al. | |
| 2021/0112072 A1* | 4/2021 | Kratzer | G06F 16/9566 |
| 2021/0173940 A1 | 6/2021 | Mylrea et al. | |
| 2021/0256111 A1* | 8/2021 | Ilincic | H04L 63/083 |
| 2021/0400075 A1 | 12/2021 | Stergioudis et al. | |
| 2022/0030036 A1 | 1/2022 | Cirelli et al. | |
| 2022/0070201 A1 | 3/2022 | Almaz et al. | |
| 2022/0150237 A1* | 5/2022 | Canfield | H04L 63/104 |
| 2022/0191247 A1 | 6/2022 | Dhoble et al. | |
| 2022/0345297 A1* | 10/2022 | Barbir | H04L 63/0815 |
| 2024/0089117 A1* | 3/2024 | Vivek | H04L 9/3247 |
| 2024/0121238 A1* | 4/2024 | Chin | H04L 63/0853 |
| 2024/0380750 A1* | 11/2024 | Xie | H04L 63/083 |

OTHER PUBLICATIONS

U.S. Appl. No. 17/068,653, filed Oct. 12, 2020, U.S. Pat. No. 11,347,560, May 31, 2022, Issued.
U.S. Appl. No. 17/550,916, filed Dec. 14, 2021, U.S. Pat. No. 11,720,410, Aug. 8, 2023, Issued.
U.S. Appl. No. 18/231,160, filed Aug. 7, 2023, Pending.
U.S. Appl. No. 17/673,692, filed Feb. 16, 2022, 20220263833, Aug. 18, 2022, Allowed.
U.S. Appl. No. 18/503,114, filed Nov. 6, 2023, Pending.
Hodges et al, Web Authentication an API for accessing Public Key Credentials—Level 2, Section 1.2, W3C, Apr. 8, 2021, pp. 9-12(downloaded Aug. 24, 2022 from https://www.w3.org/TR/webauthn-2/#sctn-usecase-registration).
OAuth 2.0 Guide ForgeRock Access Management 7.1.2, ForgeRock, Inc, May 18, 2022, 236 pages.
Denniss et al., RFC 8628, OAuth 2.0 Device Authorization Grant, Internet Engineering Task Force (IETF), Jan. 2020, 21 pages (https://www.rfc-editor.org/info/rfc8628f).
Orluc, "QRCode login with ForgeRock Identity Cloud," Medium, Feb. 2022, 10 pages (downloaded Feb. 24, 2022 from https://stephane-orluc.medium.com/qrcode-login-with-forgerock-identity-cloud-bb34ab2aea67).
Microsoft identity platform and the OAuth 2.0 device authorization grant flow, Microsoft Docs, Feb. 18, 2022, 7 pages (downloaded on Mar. 16, 2022 from https://docs.microsoft.com/en-us/azure/active-directory/develop/v2-oauth2-device-code).
Iris Recognition vs Retinal Scanning—Is there A Difference?, RightPatient, 2022, 6 pages (downloaded on Apr. 12, 2022 from https://www.rightpatient.com/biometric-patient-identification-system-custom-reference-and-resource-center-iris-vs-retina/).
ForgeRock Identity Cloud documentation, ForgeRock, Inc, May 19, 2022, 293 pages.
Cichonski et al., "Computer Security Incident Handling Guide", National Institute of Standards and Technology, U.S. Department of Commerce, Special Publication 800-61, Revision 2, http://dx.doi.org/10.6028/NIST.SP.800-61r2, Gaithersburg, MD, 2012, 79 pages.
"Hardening your cluster's security", Kubernetes Engine, (https://cloud.google.com/kubernetes-engine/docs/concepts/security-overview), Jul. 2019, 10 pages.
Dempsey, et al., "Information Security Continuous Monitoring (ISCM) for Federal Information Systems and Organizations", NIST National Institute of Standards and Technology, U.S. Dept. of Commerce, NIST Special Publication 800-137, 2011, Gaithersburg, MD, 80 pages.
"Configuring Vertical Pod Autoscaling", Kubernetes Engine, Google Cloud (https://cloud.google.com/kubernetes-engine/), Aug. 14, 2019, 8 pages.
Wilkin, "Kubernetes Deployment Dependencies", https://medium.com/google-cloud/kubernetes-deployment-dependencies-ef703e563956, Jul. 2, 2018, 21 pages.
"Vertical Pod Autoscaling", Kubernetes Engine, https://cloud.google.com/kubernetes-engine/docs/concepts/verticalpodautoscaler), Aug. 29, 2019, 8 pages.
Sakimura et al., "OpenID Connect Dynamic Client Registration 1.0 incorporating errata set 1", https://openid.net/specs/openid-connect-registration-1_0.html, Oct. 1, 2019, 19 pages.
Jayanandana, "Enable Rolling updates in Kubernetes with Zero downtime", https://medium.com/platformer-blog/enable-rolling-updates-in-kubernetes-with-zero-downtime-31d7ec.388c81, Sep. 27, 2018, 6 pages.
"FAQ: IDM/OpenIDM performance and tuning", https://backstage.forgerock.com/knowledge/kb/article/a32504603, Jun. 26, 2019, 7 pages.
Amazon; AWS Elastic Beanstalk Developer Guide; Aug. 2019; 924 pgs (https://web.archive.org/web/20190805110626/https://docs.aws.amazon.com/elasticbeanstalk/latest/dg/awseb-dg.pdf).
Amazon; AWS Elastic Beanstalk Developer Guide API version Dec. 1, 2012 dated Nov. 14, 2016, 965 pgs. [downloaded Aug. 9, 2023 from https://web.archive.org/web/20161114152137/https://docs.aws.amazon.com/elasticbeanstalk/latest/dg/awseb-dg.pdf].
Protect Users Witthout Frustrating Them Using AI-Driven Behavorial Biometrics, White Pater, Behavion Sec, 2020, (retrieved Dec. 14,

(56) References Cited

OTHER PUBLICATIONS 2021 from https://www.behaviosec.com/wp-content/uploads/2020/11/bhs-whitepaper.pdf).

Behavioral Biometrics for Mobile, BioCatch, 2021, 3 pages (retrieved Dec. 14, 2021 from https://www.biocatch.com/hubfs/New%20Boilerplate/BC%20SB%20Mobile%20Data%20v6%20NBP.pdf).

Innovating the Customer Experience Without Opening Fraud Floodgates, BioCatch, 10 pages (retrieved Dec. 14, 2021 from https://www.biocatch.com/hubfs/WP-Innovate-Customer-Experience-Without-Fraud.pdf).

Threat Matrix Guide, ID Dataweb, 7 pages (retrieved Dec. 14, 2021 from https://docs.iddataweb.com/docs/threatmetrix-1).

Zimny, Marcin, "Trust vs Authority in Access Recovery Procedures", IAM World, Marcin's Identity and Access Management Blog, Aug. 18, 2022, 6 pgs, (dowloaded Jun. 26, 2023 from https://iamworld.co.uk/wp/2022/08/18/trust-vs-authority-in-access-recovery-procedures/).

\* cited by examiner

APP FREE AUTHENTICATION ACROSS CHANNELS

RELATED APPLICATIONS

This application is related to the following:

U.S. application Ser. No. 17/673,692 titled "Authentication and access management for heterogeneous sources of anomaly detection data," filed Feb. 16, 2022.

U.S. application Ser. No. 16/579,740 titled "Secure Service Isolation Between Instances of Cloud Products Using a SaaS Model," filed Oct. 1, 2019, now U.S. Pat. No. 10,817,346, issued Oct. 27, 2020.

U.S. application Ser. No. 17/068,653 titled: "Secure Service Isolation Between Instances of Cloud Products Using a SaaS Model", filed Oct. 12, 2020, now U.S. Pat. No. 11,347,560, issued May 31, 2022.

The related applications are incorporated by reference for all purposes.

FIELD OF THE TECHNOLOGY DISCLOSED

The technology disclosed relates generally to managing authentication and access for customers of web applications. More specifically the disclosed technology focuses on providing authentication and authorization to increase security, reducing friction through the use of two authentication standards with biometrics, while avoiding installation and use of an authentication app.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

A web application authenticates and authorizes access to the application. Authentication services establish logins, process authentication requests, detect anomalous access, and generally manage identity and access. Many authentication-related services are available, on the order of hundreds or thousands of services. These services strive to provide security and ease of use of authentication and access management.

Access management and authentication of users have evolved to more than just entering a username and password. Multi-factor authentication (MFA) is common. The process of authenticating the user and determining authorization to access data is now described as a journey, rather than a login, due to the numerous paths that may be involved in authentication.

An opportunity arises to increase the ease of use for authentication by leveraging biometric security built into mobile and smartphone devices to gain app free authentication and authorization for workstations that lack biometrics to access web-based applications.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 4 shows the first stage of message flow between a workstation browser and an authorization server, to set up the authentication journey.

FIG. 5 illustrates a second stage of the message flow between the user and a smart/mobile device, to leverage biometrics.

FIG. 6 shows a third-stage message flow between the workstation browser and the authorization server as the app free authentication leads to user access of the web application.

DETAILED DESCRIPTION

Figure 1:
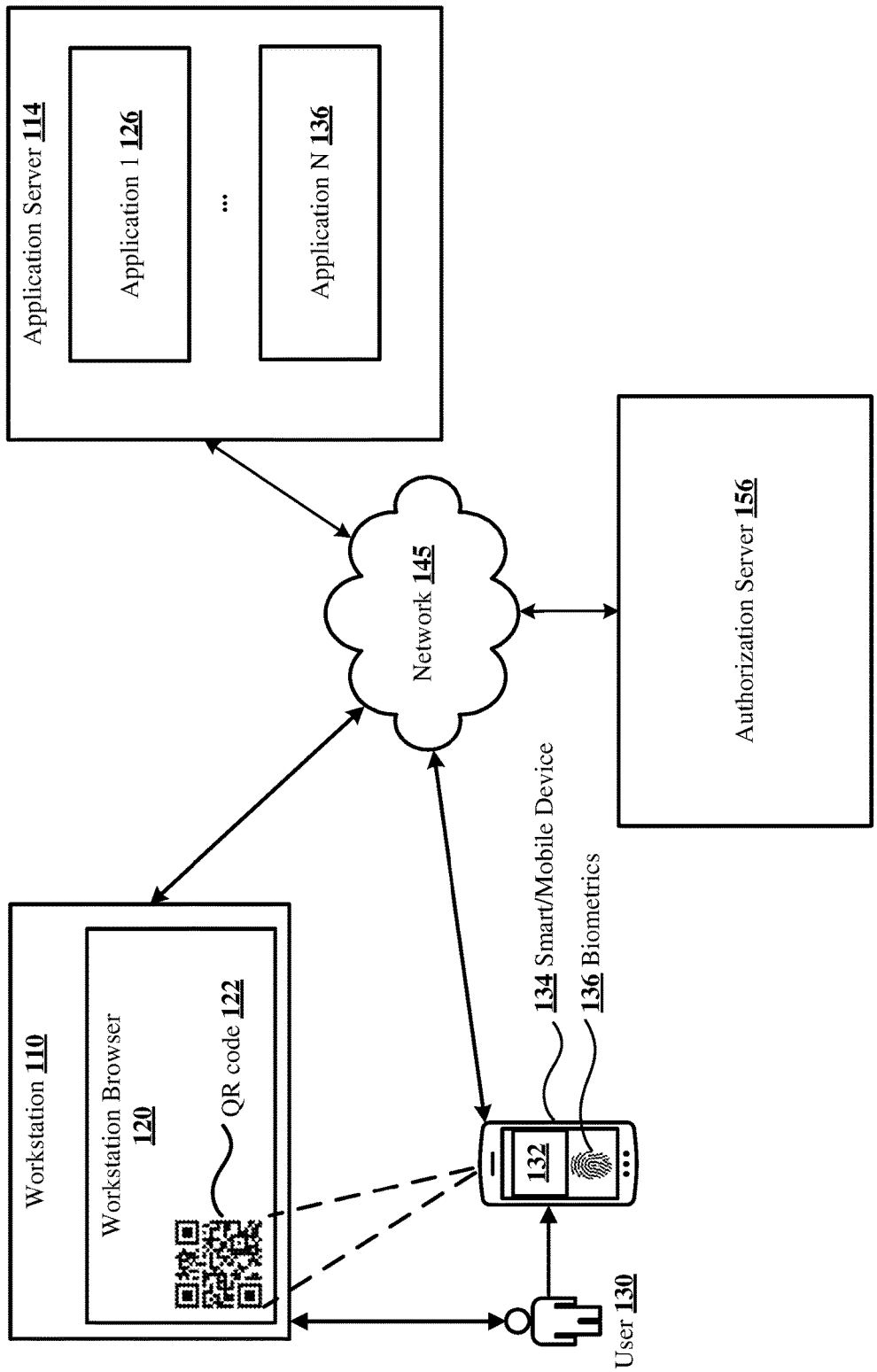
FIG. 1 shows an architectural level block diagram of a system for app free authentication and authorization, according to one embodiment of the disclosed technology.

The following detailed description is made with reference to the drawings. Sample implementations are described to illustrate the technology disclosed, not to limit its scope, which is defined by the claims. Those of ordinary skill in the art will recognize a variety of equivalent variations on the description that follows.

The technology disclosed streamlines app free authentication for a workstation using a browser to access a web-based application. Authentication typically is required to log into web-based applications. Strong authentication is an advantage, as 60% of breaches are due to hacked passwords. Convenient authentication reduces the friction caused by password lists. Convenience is important because roughly a third of online purchases are abandoned at checkout when people do not remember their passwords. Within an enterprise, technical support for a password reset is estimated to cost $50-$70. Up to 80% of all help desk interactions involve a password issue. The technology described uses a simplified, cross-channel authentication as part of a multi-factor authentication process, leveraging standard-compliant biometric authentication built into many smart/mobile devices.

The technology disclosed streamlines app free authentication by using a pre-registered smart/mobile device with biometric authentication, such as reading a fingerprint, face print, iris or retinal scan, a voice print, a motion, or any other biometric supported by Fast Identity Online (FIDO) authentication or a similar standard, instead of entering a password. The workstation browser interacts with a so-called authorization server to redirect authentication from the browser to the biometric-enabled device. The authorization server provides the browser with an encoded combination, for instance, a QR code, that the smart/mobile device uses to engage its biometrics and to interact directly with the authorization server. The workstation browser forwards the encoded combination to the smart/mobile device, for instance by displaying a QR code, sending a near field communication (NFC) message, or playing sounds. The smart/mobile device decodes a verification uniform resource identifier (URI), which may be a uniform resource locator (URL) or universal resource name (URN), and initiates a biometric authentication session with the authorization server. Once the biometric authentication is accepted by the authorization server, a session can be conducted between the workstation browser and the web-based application. Because the smart/mobile device is pre-registered for biometric authentication, no password is required.

The technology disclosed uses three-factor app free authentication, instead of the simpler two-factor authenticator apps currently use. RSA pioneered the use of a rolling, time-based code for two-factor authentication, initially selling FOBs with a precise clock and a simple display. The same approach has migrated to cell phones, which have the time synchronization advantage of using a reference time from cellular towers and/or positioning satellite networks. A system architecture for app free authentication and authorization follows.

Architecture

FIG. 1 is a system diagram for one implementation of a system 100 that practices the disclosed app free authentication and authorization. Because FIG. 1 is a system diagram, certain details are intentionally omitted to improve the clarity of the description. The discussion of FIG. 1 will be organized as follows. First, the elements of the drawing will be described, followed by their interconnections. Then, use of the elements in the system will be described in greater detail.

A user 130 interacts with a workstation browser 120 running on a workstation 110. The user also interacts with a previously registered smart/mobile device 134, which includes hardware and software to process biometrics 136, and a smart/mobile device browser 132. The smart/mobile device can capture an encoded combination 122 of data with which to interact with the authorization server 156. For instance, the smart/mobile device can use its camera to capture a QR code 122 displayed by the workstation browser 120. An enlarged sample QR code is shown code in FIG. 2. Workstation 110 and smart/mobile device 134 interact with authorization server 156 via a network 145. The workstation 110 also interacts, via the network 145, with a previously registered application server 114 hosting application 1 126 through application N 136. Note that the authorization server 114 can perform authentication and/or authorization in various implementations of the disclosed technology. These functions may be performed by one or more servers in various implementations.

A previously registered smart/mobile device 134 implements a biometric authentication procedure, such as FIDO. A user registers their biometrics with the FIDO resources of the smart/mobile device. The device, in turn, registers with the authorization server 156. Unlike the standard implementation of FIDO to authenticate the user for access to resources on or from the smart/mobile device, the technology disclosed uses the smart/mobile device as part of an authentication journey that starts on the workstation browser 120. Workstations typically do not have biometric authentication built in, with exceptions such as keyboards that have fingerprint readers. The technology disclosed leverages ubiquitous smart/mobile devices that process biometrics to allow app free access from a workstation browser to at least one application server.

Details of how to proceed with the authentication journey are communicated wirelessly by the workstation to the smart/mobile device, as explained below. A QR code is one example of wireless delivery. NFC and Bluetooth enable alternative wireless channels. Wi-Fi also could be used but current Wi-Fi connections make that more cumbersome than other delivery modes.

Figure 2:
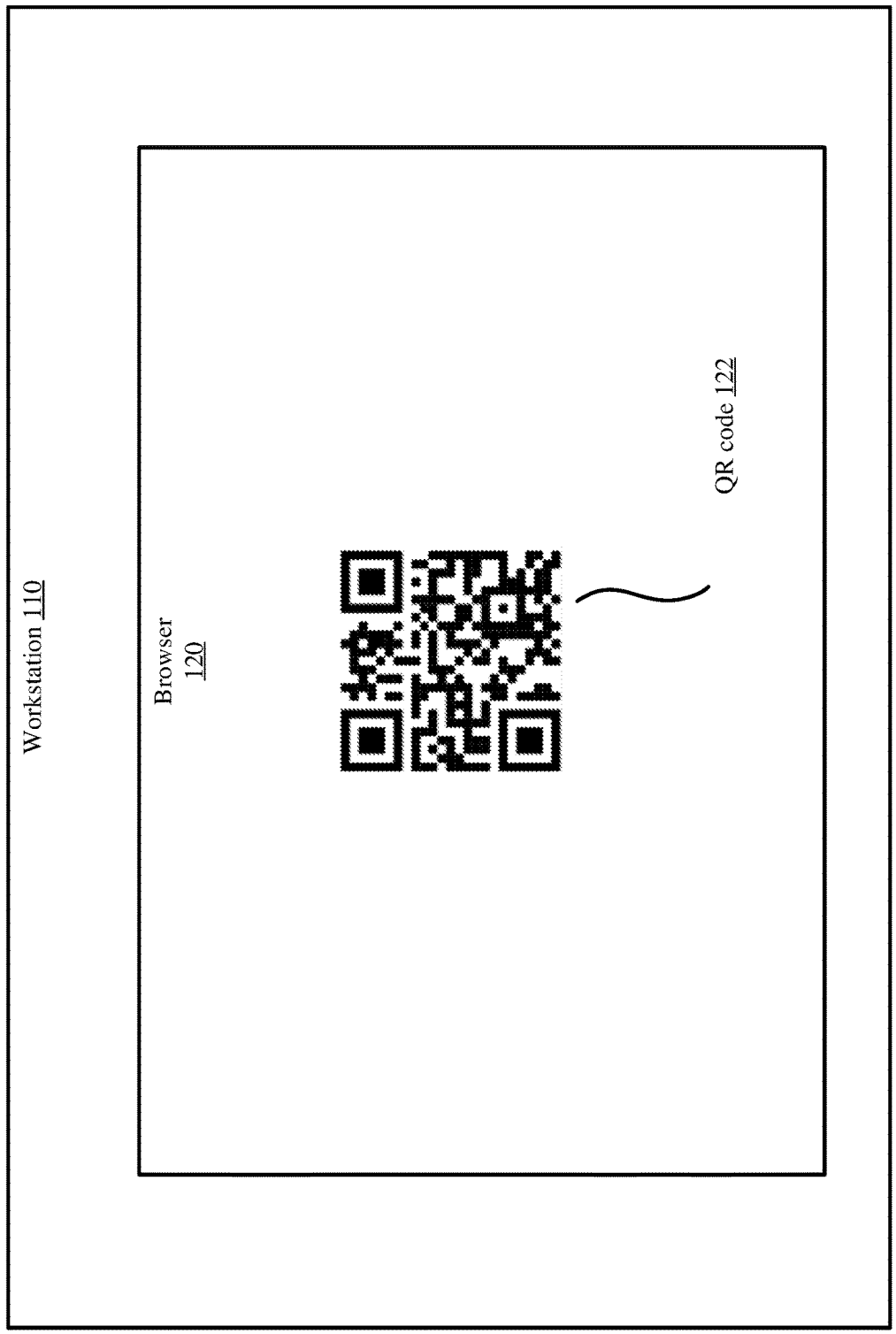
FIG. 2 shows an encoded combination of data with which to interact with the authorization server, as a QR code displayed in a workstation browser.

FIG. 2 shows an enlarged example QR code displayed on the workstation and browser 200. Following the protocol disclosed below, an encoded combination 122 of authentication journey parameters is represented by the workstation browser 120 on the workstation 110. The encoded combination is shown as a QR code. Scanning our example QR code returns the phrase "combination code", rather than an example of the parameters that would be conveyed.

Figure 3:
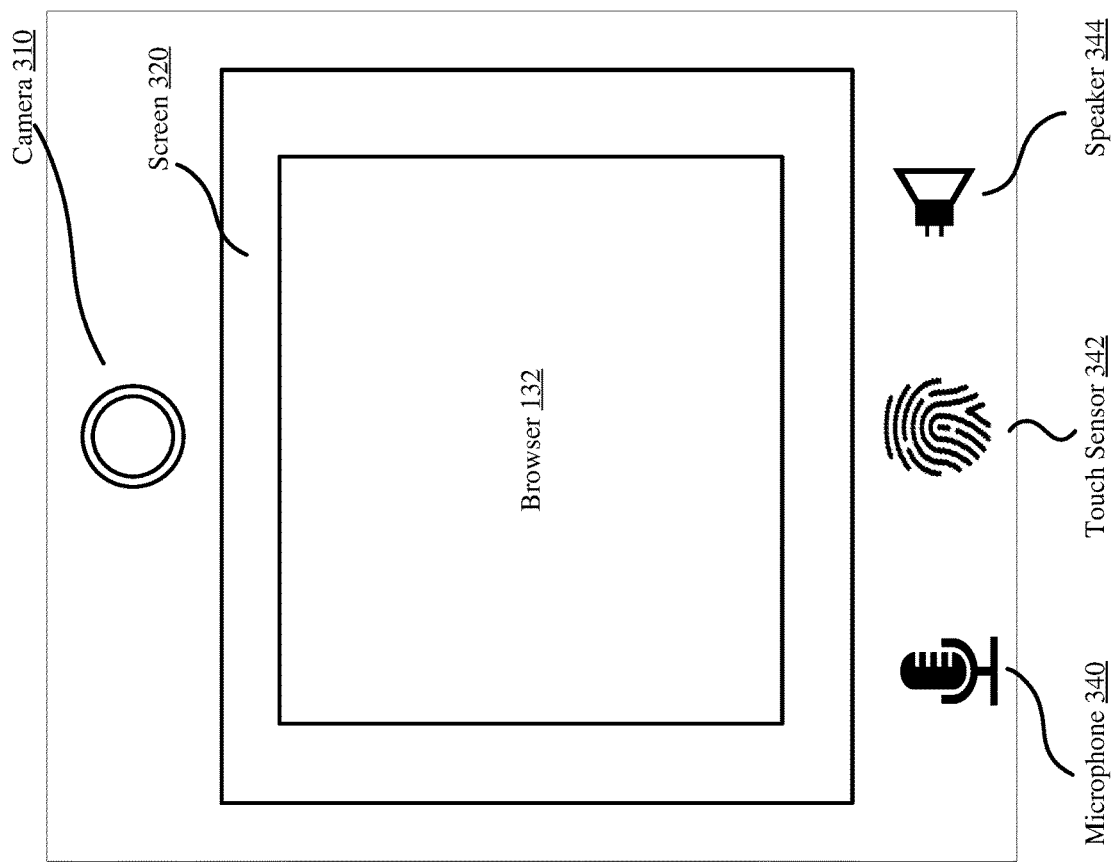
FIG. 3 shows a smart/mobile device with three biometric input paths: a camera, a microphone, and a touch sensor.

FIG. 3 shows a representative smart/mobile device 134 with three biometric input paths: a camera 310, a microphone 340 and a touch sensor 342. The device further includes a speaker 344, a screen 320, and a smart/mobile browser 132. The smart/mobile device may be a cell phone, a smartwatch, a tablet computer, or other portable smart device. The camera can be used for facial recognition, retinal recognition, iris recognition, or some other form of optical biometric identification. The microphone can be used for voice and phrase recognition. The touch sensor can read a fingerprint. Other biometric inputs can be adopted as they are added to smart/mobile devices and incorporated into standards such as FIDO. The smart/mobile browser 132 may be one of Firefox, Edge, Safari or another browser compliant with WebAuthn. Another smart/mobile device may not utilize the microphone in another implementation of the disclosed technology.

Figure 4:
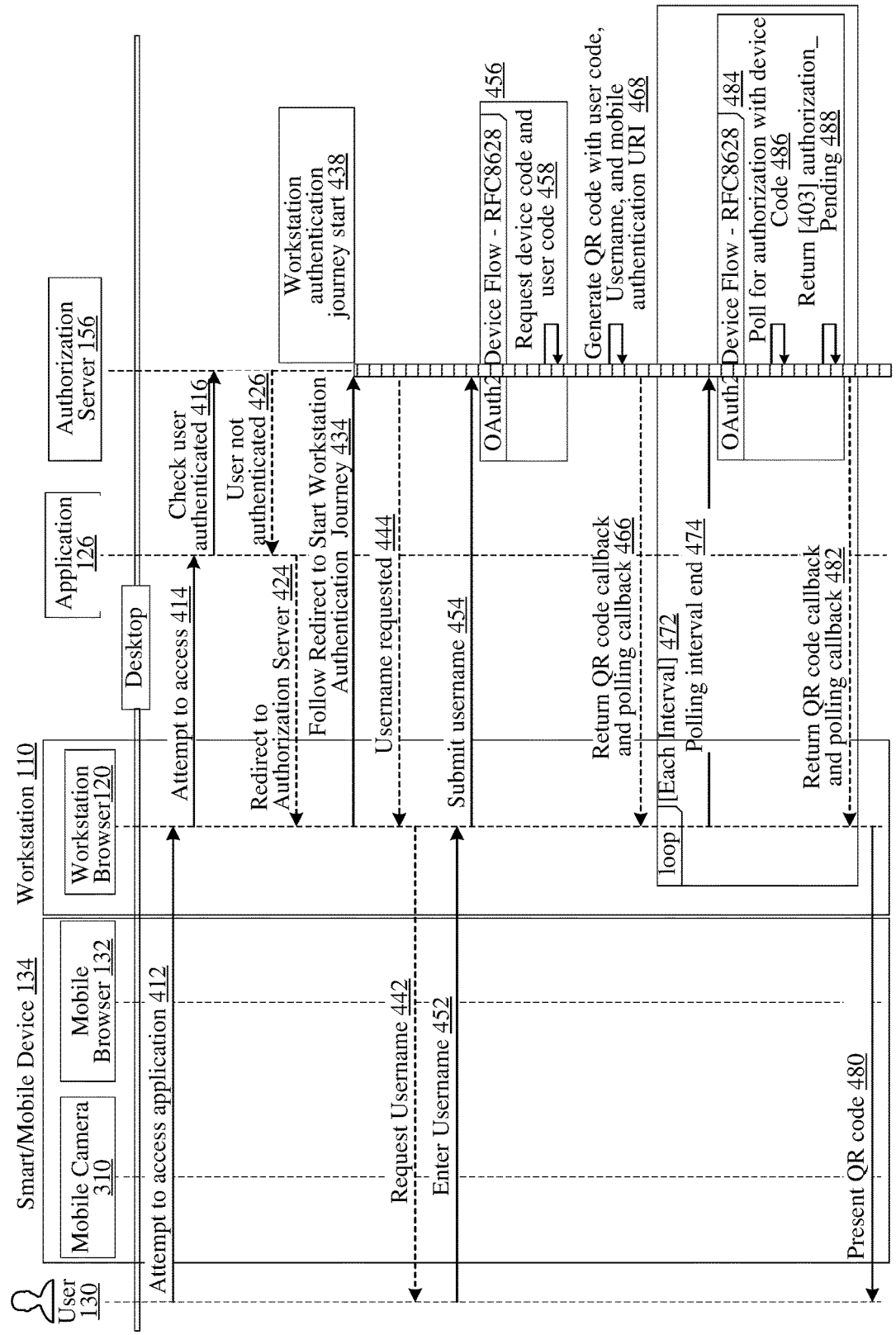
FIG. 4, FIG. 5 and FIG. 6, collectively, illustrate a message flow for app free authentication and authorization of a user to access a web application.
Figure 5:
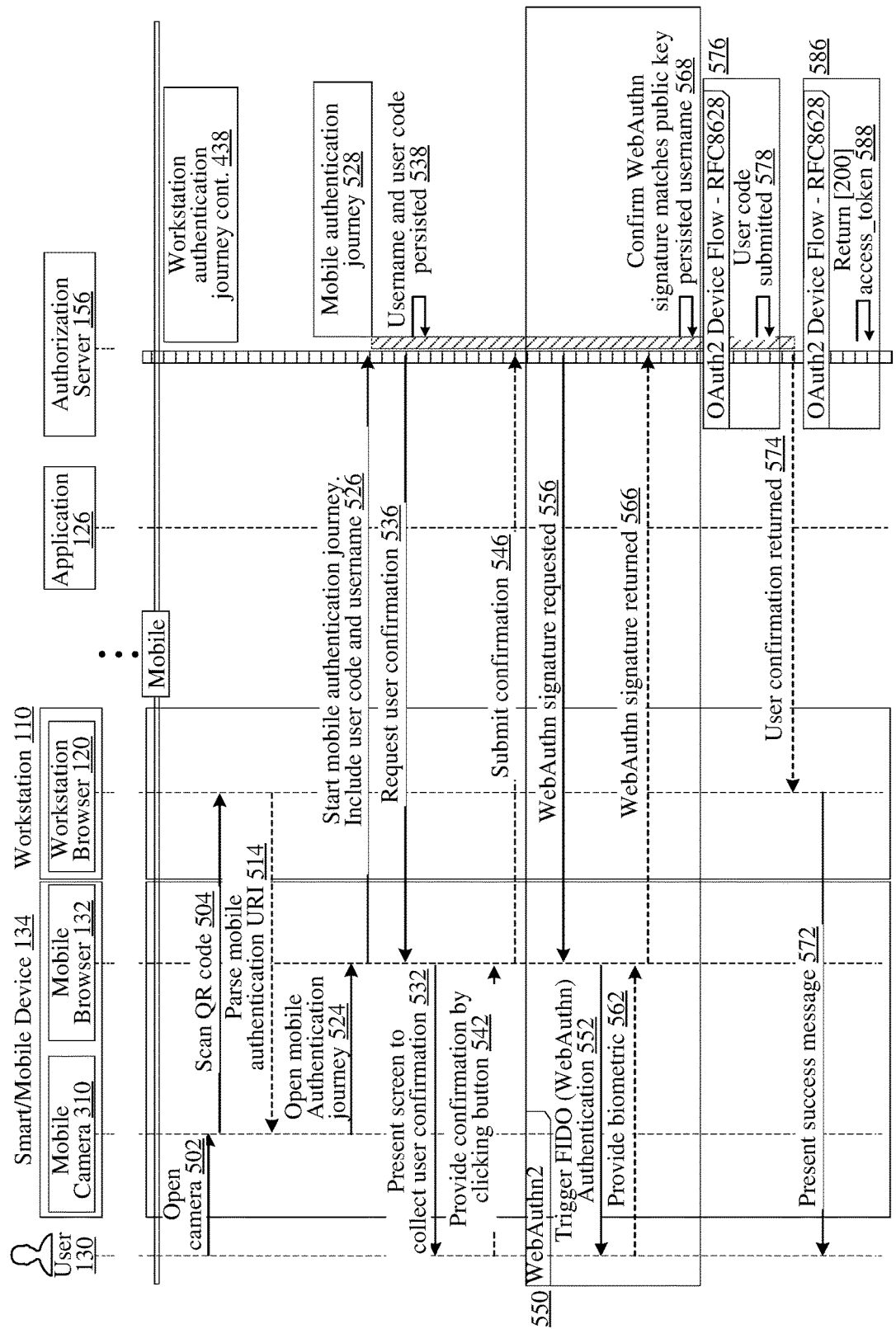
Figure 6:
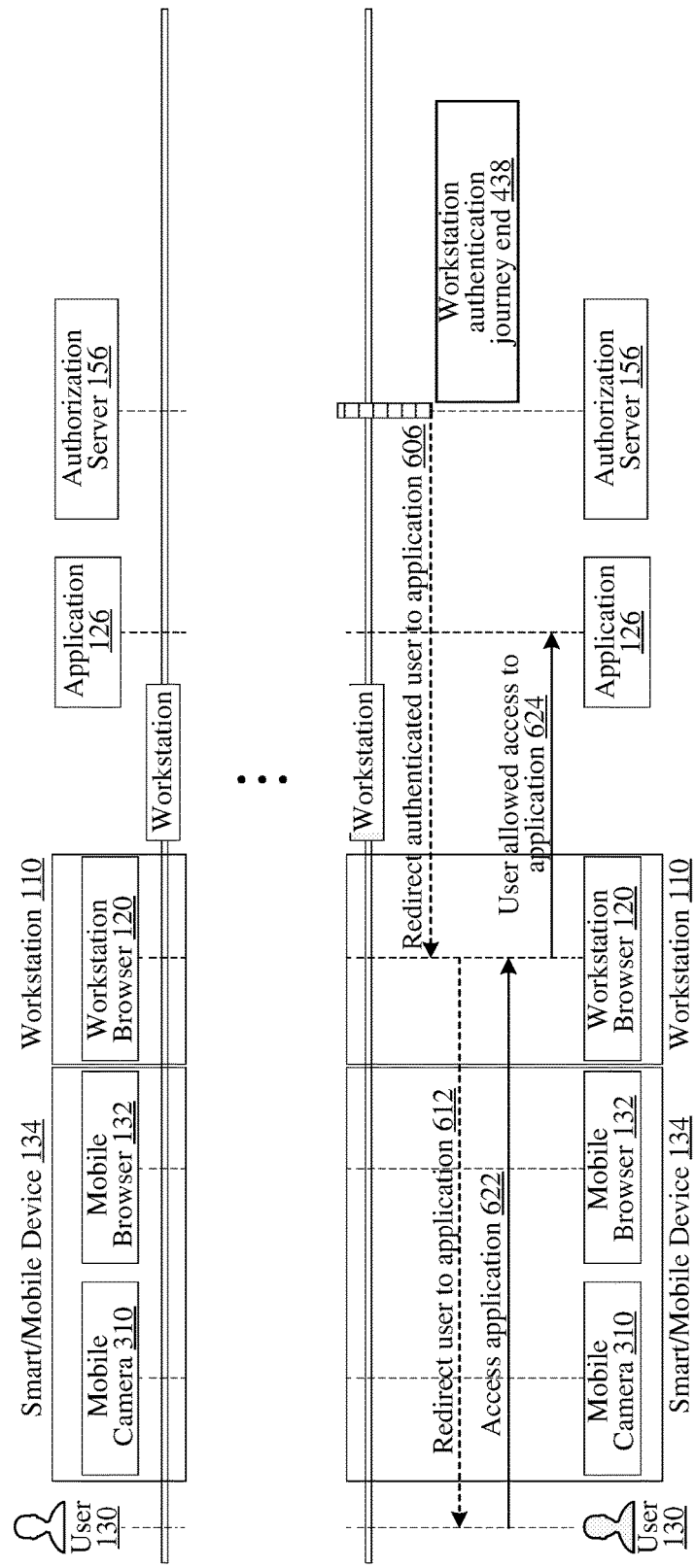

FIG. 4 through FIG. 6, collectively, illustrate a message flow for app free authentication and authorization of a user to access a web application. The message flow spans the three figures. Vertical bars represent the user 130, the user's smart/mobile device 134, a workstation 110 used to access an application 126, and an authorization server 156 that coordinates the authorization messaging. More message flow details are shown than are strictly essential to practicing the technology disclosed. FIG. 4 shows the first stage of message flow between a workstation browser 120 and an authorization server 156, to set up the authentication journey. FIG. 5 illustrates a second stage of the message flow between the user 130 and a smart/mobile device 134, to leverage biometrics. FIG. 6 shows a third stage message flow between the workstation browser 120 and the authorization server 156 as the app free authentication leads to user access to the web application. This three-part message flow shows the steps for a user interacting with a web-based application 126 on workstation 110. We begin with an overview of the three stages and then follow up with example details in the following sections.

FIG. 4 illustrates one implementation of using a workstation browser 120 to initiate a workstation authentication journey 438 with a web-based application. The workstation authentication journey is indicated by a horizontally hashed bar coincident with vertical dashed lined 156 in FIGS. 4-6. Authorization server 156 handles the authentication, as described in detail below. The authorization server encodes a user code, username, and verification URI 468 that is delivered to the workstation browser 120 for the authentication journey using the smart/mobile device. For instance, the authorization server may provide a QR code 466 encoding the user code, username, and verification URI 468.

FIG. 5 shows an example of a pre-registered smart/mobile device 134 interaction with the authorization server 156. The workstation browser forwards the user code, username, and verification URI 514 to the smart/mobile device 134. For instance, it displays a QR code 504 that the smart/mobile device camera can capture processing resources and can decode. A different encoding and wireless channel can be used in another implementation. The smart device uses the transmitted information to invoke an authentication page from the authorization server 156. Smart/mobile device 134 can use Fast Identity Online (FIDO) Alliance standard authentication 552 of the user 130 to sign a message after using biometrics 562 for authentication. The smart/mobile device returns the signed message as a WebAuthn signature 566 to authorization server 156. As issuance of standards progresses, the technology disclosed can generally be used with standards for biometric authentication of users by mobile/smart devices. The FIDO process, as an example, produces a signed message with a signature 566, which is sent from the smart/mobile device. FIDO calls for use of asymmetrical keys 568 for signing and verification of the signature. The authorization server receives the WebAuthn signature 566 and authenticates the user and smart/mobile device. Once the authorization server confirms the signature, it returns an access token 588 to the authentication journey server 424. If the user is already authenticated, the authentication steps may be bypassed.

A workstation authentication journey 438 is represented by the message flow in which the workstation is involved, starting in FIG. 4 and ending in FIG. 6. The workstation authentication journey 438 is marked in FIGS. 4-6 by a horizontal striped vertical bar toward the right of the drawings. The workstation follows the redirect 424 to start the workstation authentication journey 434. The authorization server 156 sends a username request 444 to the workstation browser 120. The workstation browser displays a message and username entry field requesting the username 442. The user 130 enters their username 452 into the workstation browser and submits the username 454 to the authorization server 156. The username may be stored in a cookie. The username submission 454 causes the OAuth 2.0 Device Flow step 456 to request a device code and a user code 458 from the authorization server using RFC 8628 (remote function call 8628) of the OAuth 2.0 standard. The device code is a long string used to verify the session between the smart/mobile device 134 and the authorization server 156. The user code is provided by the authorization server 468. An example request for a device code follows:

```
$ curl \
--request POST \
--data "response_type=device_code" \
--data "client_id=myClient" \
--data "scope=write" \
"https://openam.example.com:8443/openam/oauth2/realms/root/realms/alpha/device/code"
{
"interval": 5,
"device_code": "7a95a0a4-6f13-42e3-ac3e-d3d159c94c55...",
"verification_uri":
"https://openam.example.com:8443/openam/oauth2/realms/root/realms/alpha/device/user",
"verification_url":
"https://openam.example.com:8443/openam/oauth2/realms/root/realms/alpha/device/user",
"user_code": "VAL12e0v",
"expires_in": 300
}
```

438. The access token is also referred to as an authentication parameter. The final stage of authorization is exampled in FIG. 6.

In FIG. 6 the workstation browser 120 receives a redirection link 606 and the access token (FIG. 5 588) from the authorization server 156. The workstation browser 120 can then use that redirection link and authentication parameter to access 622 the web-based application 126.

Returning to FIG. 4, vertical bars represent the user 130, the smart/mobile device 134, the workstation 110, the application 126 and the authorization server 156. Also at the top of the figure are device components, including the smart/mobile device camera 310 and the mobile browser 132 which are components of the smart/mobile device 134. The workstation browser 120 also is shown as a component of the workstation 110. The user accesses the authorization server 156 to gain user access to the application 126.

The message flow begins in FIG. 4 when the user 130 attempts to access the application 412, 414 via the workstation browser 120, without having been authenticated for the session being established. An authorization client on the application server sends a message to the authorization server 156. If the user is not authenticated 416, the authorization server 156 sends a message back to the application indicating the user is not authenticated 426. The application 126 server authorization client then sends a message to the workstation redirecting the workstation to the authorization In the code snippet listed above, the interval is shown in minutes while expires_in is returned in seconds. For example, if the interval is 5 minutes, the expires_in value is 300 seconds. As noted, the device code is a long string. Both a URI and a URL can be returned, as URLs are preferred by some older versions of software. More generally, universal resource locators (URLs) are a subset of universal resource identifier (URI) formats, which further include universal resource names (URNS). The authorization server creates an encoded combination of the user code, username, and a mobile authentication URI 468. Again, the encoded combination may be in the form of a QR code 468, a NFC or Bluetooth message, an SMS, or some other form of communication.

While polling 472 is shown as the preceding presentation of the QR code, this is an implementation detail and may be a simplification. Polling by the workstation of the authorization server for successful authorization can continue until the user has been authenticated 574 and the workstation browser redirected to the application 606. The QR code callback and a polling callback can be supplied multiple times 466 to the workstation browser. A polling loop 472 polls 474 the authorization server at a given interval. The authorization server polls itself for authorization using the device code 486 and returns "[403] authorization_pending" 488, until authorization is complete. Once the user is authorized (e.g., FIG. 5 574, FIG. 6 606), the polling loop 472 need not continue.

Not shown in the drawings is the smart/mobile FIDO (WebAuthn) device registration. In one implementation that follows Web Authentication: An API for accessing Public Key Credentials Level 2, or some equivalent standard, at registration time the authorization server or a cooperating component creates an asymmetric key pair and stores at least one of the keys for access by the authorization server 156. The other key is for use by the mobile/smart device, in conjunction with a user's pre-registered account. Of course, a symmetrical key also could be used with an appropriate key management. The authorization server uses its stored copy of the key to verify the smart/mobile device's authentication assertion, which follows local biometric authentication of the user.

FIG. 5 illustrates the second stage smart/mobile messaging. The mobile authentication journey 528 is indicated by the diagonally striped vertical bar, coincident with vertical dashed line 156 in FIGS. 5-6. User 130 opens the camera 502 on the pre-registered smart/mobile device 134. The camera 502 scans the QR code displayed in the workstation browser 120 or otherwise receives the encoded combination 504. The smart/mobile device parses the mobile authentication URI (or URL) 514 from the encoded combination. The software native to the smart/mobile device starts the mobile authentication journey 528. In some implementations, the mobile browser 132 is used to communicate with the authorization server. The smart/mobile device browser 132 sends a message to the authorization server 156 including the user code and username 526. On the authorization server, the username and user code are persisted 538. The authorization server can send a request for user confirmation 536 to the smart/mobile device browser 132. In the flow, iOS devices require user confirmation that biometric authentication be performed. For consistency, steps 532, 542 and 546 also can be performed on Android or other devices. In step 532, a message is presented on the screen of the smart/mobile device to collect user confirmation 532. The user can confirm by clicking a button 542 in the mobile browser 132, which causes the smart/mobile device browser to submit confirmation 546 for the authorization server 156 to continue with biometric authentication. It will be clear to one skilled in the art that there are many ways a user could provide confirmation. Authorization server 156 sends a message to trigger biometric authentication 550 by the smart/mobile device. For instance, a WebAuthn signature can be requested 556. The mobile browser 132 receives the message, in some implementations, and triggers FIDO (WebAuthn) or similar biometric authentication 552. The user provides one or more biometrics 562 as the signature. The biometric may be a fingerprint, a face print, a voice print, a retinal scan, an iris scan, or any biometric supported by the biometric processing. The user's biometric is processed (not separately illustrated) by secure hardware of the smart/mobile device. These device resources implement FIDO2 or an equivalent biometric authentication protocol. Once the provided biometric 562 has been processed and accepted, the WebAuthn signature is applied and returned 566 from the smart/mobile device 134 to the authorization server 156. The authorization server confirms authentic signing of the WebAuthn signature using a key and other information such as a username 568. The next steps follow the OAuth2 RFC-8628 standard 576, or a successor to the 2022 version of this standard.

OAuth2 device flow 576 includes submitting the user code to the mobile authentication journey 528. The authorization server sends the user confirmation 574 to the workstation browser 120. The workstation browser presents a success message 572 to the user 130. The OAuth2 device flow 586 returns an access token to conclude the workstation authentication journey 438, for instance using the message "[200] access token" 588. The access token is used to validate that the cross-channel authentication was completed successfully.

FIG. 6 illustrates the third stage of the workstation authentication journey 438. Authorization server 156 redirects the authenticated user to the application 606 with a message sent to the workstation browser 120 or other app. Then the workstation browser redirects the user to the application 612. The user 130 accesses the application 622 in the workstation browser 120 and the user is allowed access 624 to the application 126. Note that at no point during the authentication and authorization process was the user required to enter a password.

Use Cases

The following pair of use cases illustrate different smart/mobile devices, different types of biometrics, different target applications, and different browsers. The use cases assume the user previously registered their smart/mobile device with the authorization server. The smart/mobile devices in these use cases are an iPhone running iOS 13.3 or later and an Android phone running the Android OS version 7 or later. OS stands for operating system. It will be clear to one skilled in the art that a number of other smart/mobile devices could be used such as a smart watch, a tablet, or a laptop computer. Currently, FIDO2 supports the following biometrics: fingerprint, face print, iris/eye print, or voice print. Different biometric modalities than these can be proposed for FIDO Alliance approval. It will be clear to one skilled in the art that biometrics added to FIDO2 in the future may be used with the technology disclosed. Two of a plurality of applications were chosen as examples for the use cases. One application for pharmacies is used by customers to order prescriptions. The other application for a bank is used by customers to do online banking. Currently, WebAuthn is supported by at least Google Chrome, Mozilla Firefox, Microsoft Edge, and Apple Safari web browsers. It will be clear to one skilled in the art that other web browsers may support WebAuthn, and thus the technology disclosed, in the future.

Use case 1: A user wishes to use the pharmacy application without having to enter a password. On his desktop computer, the user attempts to access the pharmacy application from the desktop's Chrome browser. Behind the scenes, the authorization server confirms that the user is not authenticated. The Chrome browser requests a username. The user enters his username. The authorization server checks the information sent from the workstation and sends back a QR code including the user code, username, and URI. The browser presents the user with the QR code in the Chrome browser, on screen, which the user scans with the camera on his iPhone. This triggers the interaction of the iPhone with the authorization server. The authorization server can respond by requesting confirmation from the user on his iPhone of the user's identity, which may include consent to authentication. For contrast, we suppose that the iPhone defaults to a Safari browser, instead of a Chrome browser. The iPhone presents a button in the Safari browser for the user to click to confirm his desire to log into the application. The authorization server receives the confirmation and requests a WebAuthn signature. The Safari browser on the iPhone interacts with secure biometric resources to present a message requesting the user allow his face to be scanned by the camera in his iPhone. When the authorization server receives permission it sends a message to the iPhone. The Safari browser in the iPhone presents the user with a message telling him he has access to the pharmacy application on his workstation. The user starts using the pharmacy application. The user did not have to enter a password to access the pharmacy application in this sequence using the technology disclosed.

Use case 2: A user wishes to use the banking application to view her bank account without having to enter a password. On her laptop computer the user attempts to access the banking application from the laptop's Microsoft Edge browser. Behind the scenes, the authorization server confirms that the user is not authenticated. The Microsoft Edge browser requests a username. The user enters her username. The authorization server checks the information sent from the workstation and sends back a QR code including the user code, username, and URI. The laptop presents the user with the QR code in the Microsoft Edge browser which the user scans with the camera on her Android phone. For contrast, we suppose that the Android phone uses a Chrome browser. The Android phone presents a button in the Chrome browser for the user to click to confirm her desire to log into the application. The authorization server receives the confirmation and requests a WebAuthn signature. The Chrome browser on the Android phone interacts with biometric authentication resources, leading to the user providing her fingerprint to her Android phone fingerprint scanner. Successful fingerprint authentication leads to submission of a signed message to the authorization server. When the authorization server confirms the signed message, it sends a success message to the Android phone. The Chrome browser in the Android phone presents the user with a message telling her she has access to the banking application using the Edge browser on her computer. The user views her bank account in the banking application. The user did not have to enter a password to access the banking application.

The message flow and use cases described above are implemented in a computer system, such as the system described in the next section.

Computer System

Figure 7:
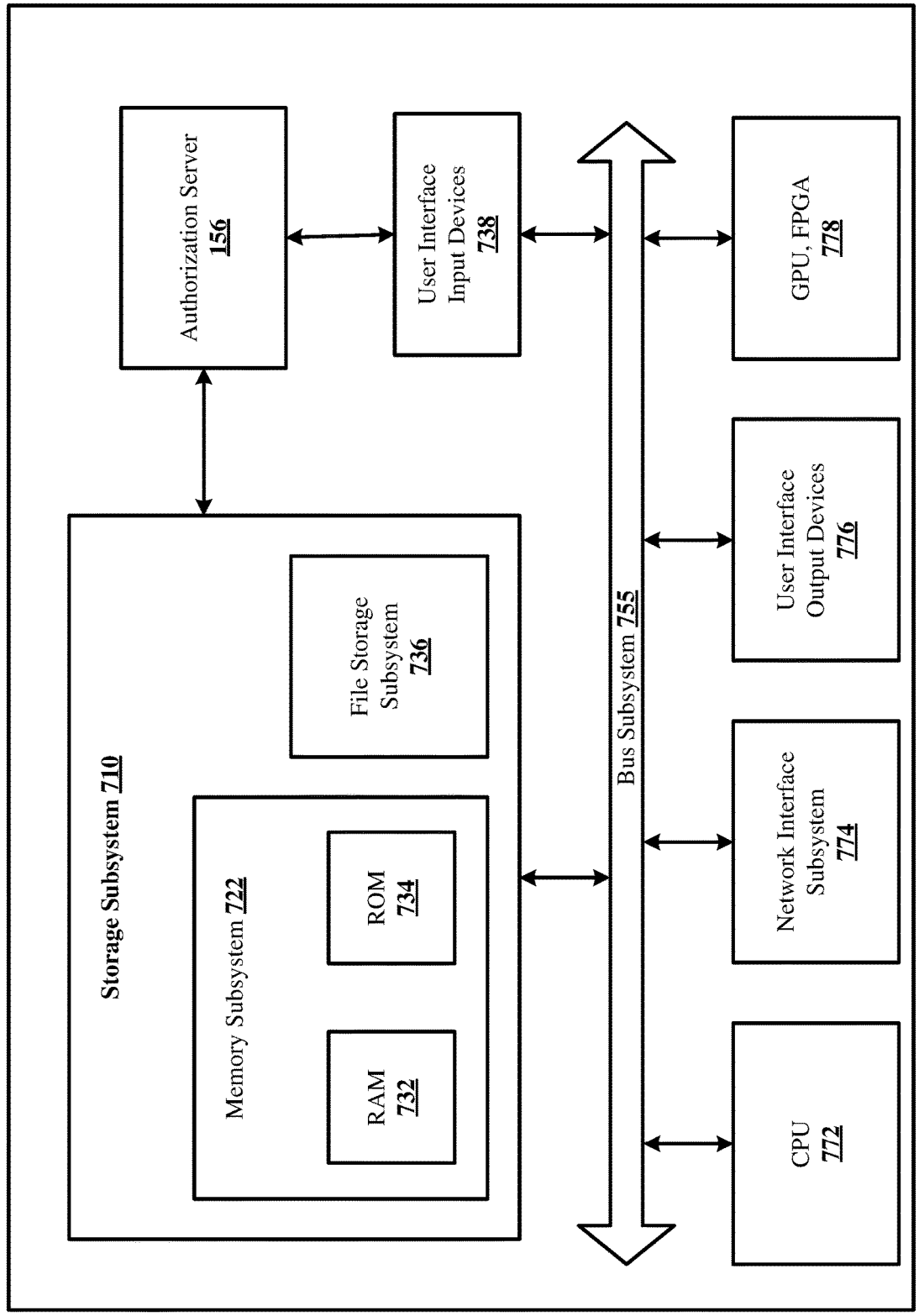
FIG. 7 shows a simplified block diagram of a computer system that can be used for app free authentication and authorization, according to one embodiment of the disclosed technology.

FIG. 7 is a simplified block diagram of a computer system 700 that can be used for app free authentication and authorization. Computer system 700 includes at least one central processing unit (CPU) 772 that communicates with a number of peripheral devices via bus subsystem 755 for providing network security services described herein. These peripheral devices can include a storage subsystem 710 including, for example, memory devices and a file storage subsystem 736, user interface input devices 738, user interface output devices 776, and a network interface subsystem 774. The input and output devices allow user interaction with computer system 700. Network interface subsystem 774 provides an interface to outside networks, including an interface to corresponding interface devices in other computer systems.

User interface input devices 738 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 700.

User interface output devices 776 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 700 to the user or to another machine or computer system.

Storage subsystem 710 stores programming and data constructs that provide the functionality of some or all of the modules and methods described herein. Subsystem 778 can be graphics processing units (GPUs) or field-programmable gate arrays (FPGAs).

Memory subsystem 722 used in the storage subsystem 710 can include a number of memories including a main random-access memory (RAM) 732 for storage of instructions and data during program execution and a read only memory (ROM) 734 in which fixed instructions are stored. A file storage subsystem 736 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 736 in the storage subsystem 710, or in other machines accessible by the processor.

Bus subsystem 755 provides a mechanism for letting the various components and subsystems of computer system 700 communicate with each other as intended. Although bus subsystem 755 is shown schematically as a single bus, alternative implementations of the bus subsystem can use multiple busses.

Computer system 700 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, many other configurations of computer system 700 are possible having more or fewer components than the computer system depicted in FIG. 7.

Particular Implementations

We describe some implementations and features for an app free authentication journey in the following discussion. The method can be viewed from the perspective of the user or the authorization server.

One implementation, from the perspective of the user, discloses a computer-implemented method of app free authentication or authorization for a user to access a web-based application. This method can be applied where the user is interacting with a workstation browser running on a workstation to access the web-based application and using resources of a smart/mobile device for biometric authentication. The method includes using the workstation browser, requesting access to the web-based application and sending an authorization server at least a username and receiving, in response, an encoding of parameters including at least a user code or the username plus a universal resource indicator (URI), and transmitting a version of the encoding to the smart/mobile device. The method also includes using the smart/mobile device to process the version of the encoding, including decoding at least the user code or the username plus the URI and using decoded parameters to initiate contact, directly or indirectly, with the authorization server. The authorization server can be reached using the URI, which may be a URL or URN. The smart/mobile device receives a message from the authorization server triggering biometric authentication by the smart/mobile device and uses biometric authentication resources of the smart/mobile device to authenticate the user, sign a message and send the signed message to the authorization server. Thereafter, the workstation browser gains access to the web-based application, responsive to the signed message.

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

In some implementations of the method, the version of the encoding transmitted to the smart/mobile device can be a QR code or a JSON data structure for transmission via near field communications (NFC) or Bluetooth. The encoding can encode the user code, the username and the URI. It can include the URI and a universal resource locator (URL). The encoding can include the user code, the username and the URI assigned by the authorization server.

Another implementation, from the perspective of the authorization server, discloses a computer-implemented method of app free authentication or authorization by an authorization server of a user to access a web-based application. This method can be applied when the user is interacting with a workstation browser running on a workstation, and further using resources of a smart/mobile device for biometric authentication. The method includes receiving at the authorization server a request from the workstation browser for access to the web-based application, the request including at least a username of the user and sending, in response, an encoding of parameters including at least a user code or the username plus a universal resource indicator (URI), in a format suitable for transmission to a smart/mobile device. The method also includes receiving from the smart/mobile device a call made to the URI to initiate biometric authentication by the smart/mobile device and sending the smart/mobile device information approval to proceed with biometric authentication for access to the web-based application. The method further includes receiving a signed message from the smart/mobile device indicating successful biometric authentication using resources of the smart/mobile device, authenticating the user responsive to the signed message and generating a token held by the authorization server that authorizes the workstation browser to access the web-based application. Then, sending the workstation browser a redirection for access to the web-based application.

In many implementations of the method, the version of the encoding sent to the smart/mobile device can be a QR code or a JSON data structure for transmission via NFC or Bluetooth. The encoding can encode the user code, the username and the URI. It can include the URI and a universal resource locator (URL). The encoding can include the user code, the username and the URI assigned by the authorization server.

Other implementations of the disclosed technology described in this section can include a tangible non-transitory computer readable storage media, including program instructions loaded into memory that, when executed on processors, cause the processors to perform any of the methods described above, causing the processors to implement actions for app free authentication or authorization for a user to access a web-based application. Yet another implementation of the disclosed technology described in this section can include a system including memory and one or more processors operable to execute computer instructions, stored in the memory, to perform any of the methods described above. In one implementation, a computer system includes a workstation having memory, a workstation browser, and a smart/mobile device, with the non-transitory computer readable media including the workstation memory and the smart/mobile device memory holding respective parts of the instructions.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

What is claimed is:

1. A method of app free authentication or authorization of a user to access a web-based application, wherein the user is interacting with a workstation browser running on a workstation to access the web-based application and using resources of a smart/mobile device for biometric authentication, including:
    using the workstation browser, requesting access to the web-based application and sending an authorization server at least a username;
    receiving, at the workstation browser, an encoding of parameters including at least a user code or the username plus a universal resource indicator (URI), and transmitting a version of the encoding to the smart/mobile device;
    using the smart/mobile device to process the version of the encoding, including decoding at least the user code or the username plus the URI and using decoded parameters to initiate contact, directly or indirectly, with the authorization server;
    receiving a message from the authorization server triggering biometric authentication by the smart/mobile device;
    using biometric authentication resources of the smart/mobile device, authenticating the user, signing the message to define a signed message and sending the signed message to the authorization server; and
    receiving, at the workstation browser, access to the web-based application, responsive to the signed message.

2. The method of claim 1, wherein the version of the encoding transmitted to the smart/mobile device is a QR code.

3. The method of claim 2, wherein the QR code encodes the user code, the username and the URI.

4. The method of claim 1, wherein the version of the encoding transmitted to the smart/mobile device is by near field communications (NFC) or Bluetooth.

5. The method of claim 1, wherein the URI is a universal resource locator (URL).

6. The method of claim 1, further including in the encoding received at the workstation browser both the URI and a universal resource locator (URL).

7. The method of claim 1, further including in the encoding received at the workstation browser the user code, the username and the URI assigned by the authorization server.

8. A method of app free authentication or authorization by an authorization server of a user to access a web-based application using a workstation browser running on a workstation, and further using resources of a smart/mobile device for biometric authentication, including:

receiving at the authorization server a request from the workstation browser for access to the web-based application, the request including at least a username of the user;

sending the workstation browser an encoding of parameters including at least a user code or the username plus a universal resource indicator (URI), in a format suitable for transmission to the smart/mobile device;

receiving from the smart/mobile device a call made to the URI to initiate biometric authentication by the smart/mobile device;

sending the smart/mobile device approval to proceed with biometric authentication for access to the web-based application;

receiving a signed message from the smart/mobile device indicating successful biometric authentication using the resources of the smart/mobile device, authenticating the user responsive to the signed message and generating a token held by the authorization server that authorizes the workstation browser to access the web-based application; and sending the workstation browser a redirection for access to the web-based application.

9. The method of claim 8, wherein the encoding sent to the workstation browser for transmission to the smart/mobile device is a QR code.

10. The method of claim 9, wherein the QR code encodes the user code, the username and the URI.

11. The method of claim 8, wherein the encoding sent to the workstation browser for transmission to the smart/mobile device is by near field communications (NFC) or Bluetooth.

12. The method of claim 8, wherein the URI is a universal resource locator (URL).

13. The method of claim 8, further including in the encoding sent to the workstation browser both the URI and a universal resource locator (URL).

14. The method of claim 8, further including in the encoding sent to the workstation browser the user code, the username and the URI assigned by the authorization server.

15. A non-transitory computer readable media impressed with instructions that, when executed on processing hardware of a workstation and a smart/mobile device, cause the processing hardware to implement actions for app free authentication or authorization for a user to access a web-based application, wherein the user is interacting with a workstation browser running on the workstation to access the web-based application and using resources of the smart/mobile device for biometric authentication, the actions including:

using the workstation browser, requesting access to the web-based application and sending an authorization server at least a username;

receiving at the workstation browser an encoding of parameters including at least a user code or the username plus a universal resource indicator (URI), and transmitting a version of the encoding to the smart/mobile device;

using the smart/mobile device to process the version of the encoding, including decoding at least the user code or the username plus the URI and using decoded parameters to initiate contact, directly or indirectly, with the authorization server;

receiving a message from the authorization server triggering biometric authentication by the smart/mobile device;

using biometric authentication resources of the smart/mobile device, authenticating the user, signing the message to define a signed message and sending the signed message to the authorization server; and receiving, at the workstation browser, access to the web-based application, responsive to the signed message.

16. The non-transitory computer readable media of claim 15, wherein the version of the encoding sent to the workstation browser for transmission to the smart/mobile device is a QR code.

17. A computer system including a workstation having memory, a workstation browser, and a smart/mobile device, wherein the non-transitory computer readable media of claim 15 includes the memory of the workstation and memory of the smart/mobile device holding respective parts of the instructions.

18. The computer system of claim 17, wherein a version of the encoding implemented by the instructions to be sent to the workstation browser for transmission to the smart/mobile device is a QR code.

19. A non-transitory computer readable media impressed with instructions that, when executed on processing hardware of a workstation and a smart/mobile device, cause the processing hardware to implement actions for app free authorization by an authorization server of a user to access a web-based application using a workstation browser running on the workstation and using resources of the smart/mobile device for biometric authentication, the actions including:

receiving at the authorization server a request from the workstation browser for access to the web-based application, the request including at least a username of the user;

sending the workstation browser an encoding of parameters including at least a user code or the username plus a universal resource indicator (URI), in a format suitable for transmission to the smart/mobile device;

receiving from the smart/mobile device a call made to the URI to initiate biometric authentication by the smart/mobile device;

sending the smart/mobile device approval to proceed with biometric authentication for access to the web-based application;

receiving a signed message from the smart/mobile device indicating successful biometric authentication using the resources of the smart/mobile device, authenticating the user responsive to the signed message and generating a token held by the authorization server that authorizes the workstation browser to access the web-based application; and sending the workstation browser a redirection for access to the web-based application.

20. The non-transitory computer readable media of claim 19, wherein a version of the encoding sent to the workstation browser for transmission to the smart/mobile device is a QR code.

21. A computer system including the authorization server having memory, wherein the non-transitory computer readable media of claim 19 includes the memory of the authorization server holding the instructions.

22. The computer system of claim 21, wherein a version of the encoding implemented by the instructions to be sent to the workstation browser for transmission to the smart/mobile device is a QR code.

* * * * *